US006845987B2

(12) United States Patent
McCutchan

(10) Patent No.: US 6,845,987 B2
(45) Date of Patent: Jan. 25, 2005

(54) SHAFT SEAL

(75) Inventor: Sean McCutchan, Hamden, CT (US)

(73) Assignee: United Technologies Corporation, Hartford, CT (US)

( * ) Notice: Subject to any disclaimer, the term of this patent is extended or adjusted under 35 U.S.C. 154(b) by 55 days.

(21) Appl. No.: 10/241,229

(22) Filed: Sep. 10, 2002

(65) Prior Publication Data

US 2004/0046325 A1 Mar. 11, 2004

(51) Int. Cl.[7] ............................................. F16J 15/40
(52) U.S. Cl. ........................ 277/411; 277/427; 277/431
(58) Field of Search ................................ 277/411, 427, 277/431

(56) References Cited

U.S. PATENT DOCUMENTS

| | | | | |
|---|---|---|---|---|
| 3,531,131 A | * | 9/1970 | Hummer | 277/397 |
| 4,156,530 A | * | 5/1979 | Rivkin et al. | 277/409 |
| 5,239,750 A | * | 8/1993 | Wright | 29/888.3 |
| 5,813,674 A | * | 9/1998 | Dickie et al. | 277/395 |
| 5,904,356 A | * | 5/1999 | Mundy | 277/431 |
| 6,164,658 A | * | 12/2000 | Collin | 277/418 |
| 6,516,618 B1 | * | 2/2003 | Bock | 60/782 |
| 6,568,688 B1 | * | 5/2003 | Boeck | 277/411 |
| 6,658,987 B1 | * | 12/2003 | Oberhauser | 92/168 |

FOREIGN PATENT DOCUMENTS

| | | |
|---|---|---|
| GB | 2 125 118 A | 2/1984 |
| WO | WO 03/025438 A1 | 3/2003 |

* cited by examiner

*Primary Examiner*—Alison K. Pickard
(74) *Attorney, Agent, or Firm*—Bachman & LaPointe, P.C.

(57) ABSTRACT

The present invention relates to a seal assembly for use in a rotary machine. The seal assembly comprises a first member and a seal carrier mounted to the first member by a mounting member, a second member spaced from the first member and a seal running member positioned on the second member, and a hydraulic seal for preventing gas leaking from a high pressure source to a low pressure compartment through the mounting member.

13 Claims, 1 Drawing Sheet

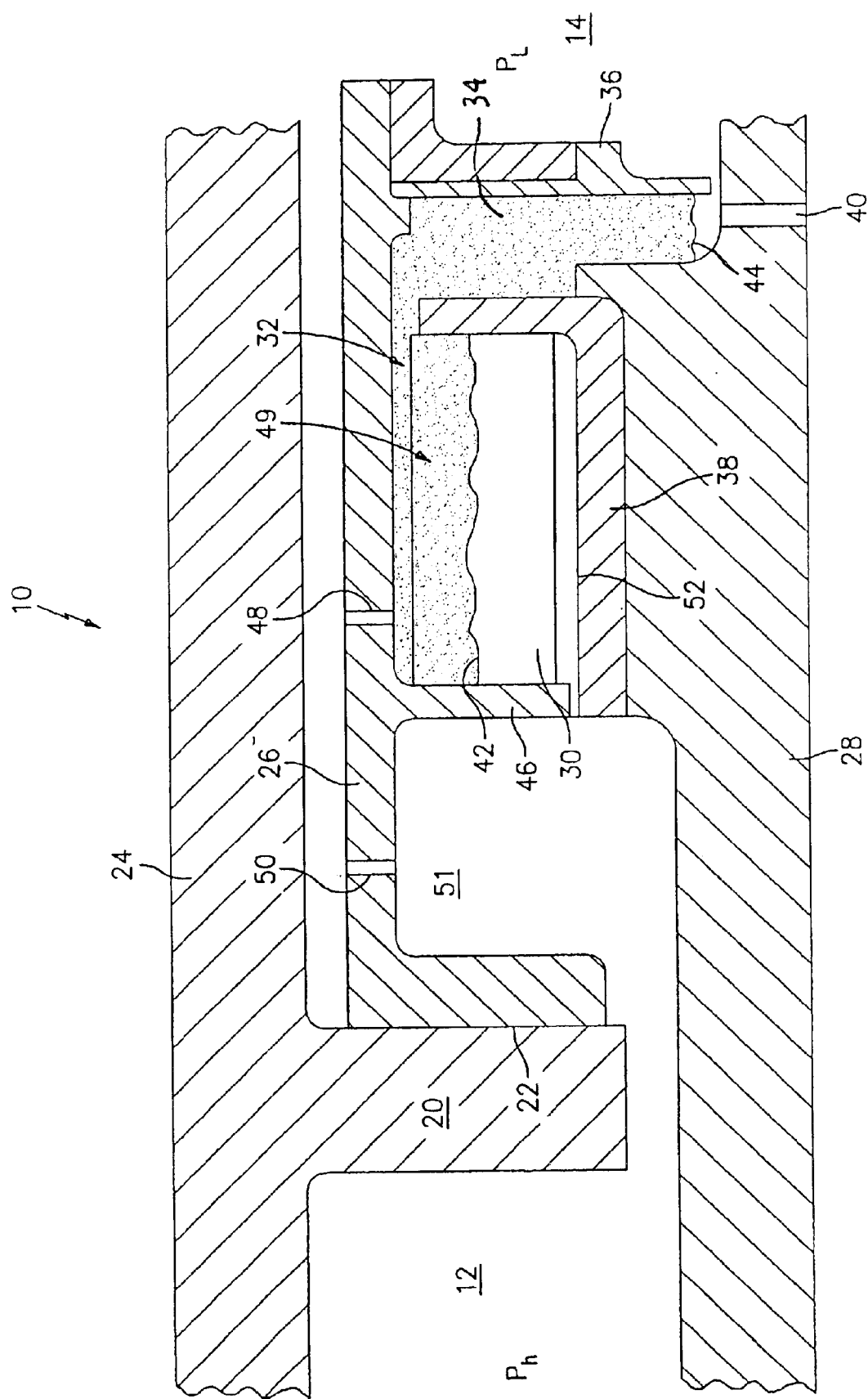

SHAFT SEAL

BACKGROUND OF THE INVENTION

The present invention relates to a seal assembly for use in a rotary machine such as a gas turbine engine.

The present invention addresses a fundamental issue plaguing current designs considered for the sealing of an annulus between two concentric shafts where rotation of the sealing members is required due to a lack of stationary mounting points. Prior art sealing methods incorporate a solid secondary seal such as a piston ring. For any inter-shaft applications lacking stationary sealing members, inertia forces experienced by a solid secondary seal create high friction forces between the secondary seal and its supporting members, thereby preventing axial travel or at least resulting in undesirable wear.

SUMMARY OF THE INVENTION

Accordingly, it is an object of the present invention to provide a seal assembly for use in a rotary machine.

It is a further object of the present invention to provide a seal assembly which is capable of sealing the annulus formed between two concentric shafts with co-rotating or counter-rotating behavior.

It is still a further object of the present invention to provide a seal assembly which is applicable to seal a single shaft and a stator.

The foregoing objects are attained by the seal assembly of the present invention.

In accordance with the present invention, a seal assembly for use in a rotary machine is provided. The seal assembly broadly comprises a first member and a seal carrier mounted to the first member by a mounting member, a second member spaced from the first member and a seal running member positioned on the second member, and hydraulic seal means for preventing gas leakage from a high pressure source to a low pressure compartment through the mounting member.

Other details of the shaft seal of the present invention, as well as other objects and advantages attendant thereto, are set forth in the following detailed description and the accompanying drawing wherein like reference numerals depict like elements.

BRIEF DESCRIPTION OF THE DRAWINGS

The FIGURE illustrates a shaft seal assembly in accordance with the present invention.

DETAILED DESCRIPTION OF THE PREFERRED EMBODIMENT(S)

The FIGURE illustrates a seal assembly 10 for a rotary machine which reduces gas leakage from a high pressure source 12 to a low pressure compartment 14 such as a bearing compartment of a gas turbine engine. The seal assembly 10 of the present invention is applicable to an annulus formed between two concentric shafts with co-rotating or counter-rotating behavior. The seal assembly of the present invention is also useful for sealing a single shaft and stator.

The seal assembly 10 includes a seal running member 20 and a seal carrier 26. The seal carrier 26 rotates with and is flexibly mounted to a first member 28 by a flexible mounting 30, which first member 28 may be the innermost shaft of two concentric shafts. The flexible mounting 30 may comprise any suitable flexible mounting known in the art. The seal carrier 26 is mounted so that axial travel of the seal carrier 26 relative to the first member 28 is allowed. The seal running member 20 has an axially pointing, primary sealing face 22 attached or positioned on a second member 24, which second member may be the outermost shaft of two concentric shafts or a stationary member. If desired, the seal running member 20 may be integrally formed with the second member 24. The primary sealing face 22 requires close proximity to or contact between the seal running member 20 and the seal carrier 26. The primary seal interface 22 preferably tolerates high rotational slip and therefore may include a lift geometry that creates hydrodynamic forces to separate the seal carrier 26 from the primary sealing surface 22.

Gas leakage through the flexible mounting 30 is prevented by a hydraulic seal 32, which uses the inertia of a liquid 34. The hydraulic seal 32 is formed by the seal carrier 26, a back plate 36, and an L-shaped fin 38. Liquid is supplied to the hydraulic seal 32 through one or more supply holes 40 in the first member 28. The surface 42 of the liquid upstream of the fin 38 stabilizes at a larger radius than the downstream liquid surface 44 when the pressure $P_h$ in the source 12 is greater than the pressure $P_L$ in the compartment 14. The inner radii of the front wall 46 of the seal carrier 26 and the back plate 36 are designed to tolerate the aforementioned height difference without spillover of the liquid.

A preferred embodiment of the seal assembly of the present invention incorporates continuous replenishment of the liquid used in the hydraulic seal 32. One or more drain holes 48 are placed at the outer surface of the trough 49 between the seal carrier 26 and the fin 38 to prevent unwanted build-up of particulate matter or debris. Continuous replenishment of the liquid is also useful for removing heat produced at the primary sealing interface. Preferably, liquid enters through the supply hole(s) 40 at a rate higher than the outflow from the drain hole(s) 48. Excess liquid spills over the inner radius of the back plate 36 or front wall 46 depending on the design and operating conditions.

Various details may be incorporated into the seal assembly 10 to reduce unwanted liquid discharge from the trough 49 during a momentary pressure reversal where $P_L$ is greater than $P_h$. Also features may be included to prevent unwanted liquid entrapment. The inner radius of the front wall 46 is maintained in close tolerance with a piloting radius 52 to minimize the leakage area that may allow liquid from the hydraulic seal 32 to the upstream side of the primary seal. Liquid collected in the trough 51 formed between the primary sealing surface 22 and the front wall 46 is allowed to escape through the drain hole(s) 50. The drain hole(s) 50 may be designed to minimize gas leakage during normal operation. Valves may be used to cover some or all of the drain holes 50 during some operating conditions.

The primary sealing interface 22 should tolerate high rubbing velocity in some applications. The seal assembly for such applications utilizes a hydrodynamic lift force generated by the geometry of the surface 22. Also, various primary sealing devices are known for lower rubbing velocities. One such device includes a carbon design that directly contacts the primary sealing interface and is sometimes lubricated by oil. If desired, one such device could be employed in the sealing interface 22.

If desired, the seal assembly 10 of the present invention could be constructed so that the seal carrier 26 is flexibly mounted to the second member 24 and the seal running member 20 is mounted to the first member 28. In such a construction, the hydraulic secondary seal 32 would rotate with the first member 24.

The seal assembly of the present invention is advantageous from the standpoint that high inertial loading does not cause friction and wear at the secondary hydraulic seal. Further, the secondary hydraulic seal can tolerate relative axial movement and misalignment between the first member 28 and second member 24.

It is apparent that there has been provided in accordance with the present invention a shaft seal which fully satisfies the objects, means, and advantages set forth hereinbefore. While the present invention has been described in the context of specific embodiments thereof, other alternatives, modifications and variations will become apparent to those skilled in the art having read the foregoing description. Accordingly, it is intended to embrace those alternatives, modifications, and variations as fall within the broad scope of the appended claims.

What is claimed is:

1. A seal assembly for use in a rotary machine comprising:
   a first member and a seal carrier mounted to said first member by a mounting member;
   a second member, wherein said seal carrier contacts said seal running member spaced from said first member and a seal running member positioned on said second member; and
   hydraulic seal means for preventing gas leakage from a high pressure source to a low pressure compartment through said mounting member.

2. A seal assembly according to claim 1, wherein said seal running member is integrally formed on said second member.

3. A seal assembly according to claim 1, wherein said first member comprises a first rotating shaft and said second member comprises a second rotating shaft.

4. A seal assembly according to claim 1, wherein said first member comprises a rotating shaft and said second member comprises a static member.

5. A seal assembly according to claim 1, wherein said mounting member allows axial travel of the seal carrier relative to said first member.

6. A seal assembly according to claim 1, further comprising means for supplying a liquid to said hydraulic seal means.

7. A seal assembly according to claim 6, wherein said liquid supplying means comprises at least one supply hole in said first member.

8. A seal assembly according to claim 7, wherein said hydraulic seal means is formed by said seal carrier, a back plate, and a fin and wherein said hydraulic seal means has a trough formed by said seal carrier, a front wall and said fin.

9. A seal assembly according to claim 8, wherein said hydraulic seal means further comprises means for preventing unwanted build-up of particulate matter or debris.

10. A seal assembly according to claim 9, wherein said preventing means comprises at least one drain hole in an outer surface of said trough.

11. A seal assembly according to claim 10, wherein said liquid enters said hydraulic seal means through said at least one supply hole at a rate higher than outflow through the at least one drain hole.

12. A seal assembly for use in a rotary machine comprising:
    a first member and a seal carrier mounted to said first member by a mounting member;
    a second member spaced from said first member and a seal running member integrally formed on said second member, wherein said seal carrier contacts said seal running member;
    said first member comprising a first rotating shaft and said second member comprising a second rotating shaft; and
    hydraulic sealing means for preventing gas leakage from a high pressure source to a low pressure compartment through said mounting member.

13. A seal assembly for use in a rotary machine comprising:
    a first member and a seal carrier mounted to said first member by a mounting member;
    a second member spaced from said first member and a seal running member integrally formed on said second member wherein, said seal carrier contacts said seal running member;
    hydraulic seal means for preventing gas leakage from a high pressure source to a low pressure compartment through said mounting member;
    means for supplying a liquid to said hydraulic seal means; and
    said liquid supplying means comprises at least one supply hole in said first member.

* * * * *